LOW LEVEL VOLTAGE TO FREQUENCY CONVERTER

Filed Sept. 29, 1961 2 Sheets-Sheet 1

INVENTOR.
D. A. FLUEGEL

BY Hudson & Young

ATTORNEYS

June 25, 1963 D. A. FLUEGEL 3,094,875

LOW LEVEL VOLTAGE TO FREQUENCY CONVERTER

Filed Sept. 29, 1961 2 Sheets-Sheet 2

INVENTOR.
D. A. FLUEGEL

BY Hudson & Young

ATTORNEYS

United States Patent Office 3,094,875

Patented June 25, 1963

3,094,875

LOW LEVEL VOLTAGE TO FREQUENCY CONVERTER

Dale A. Fluegel, Bartlesville, Okla., assignor to Phillips Petroleum Company, a corporation of Delaware Filed Sept. 29, 1961, Ser. No. 141,716

18 Claims. (Cl. 73—359)

Figure 1:
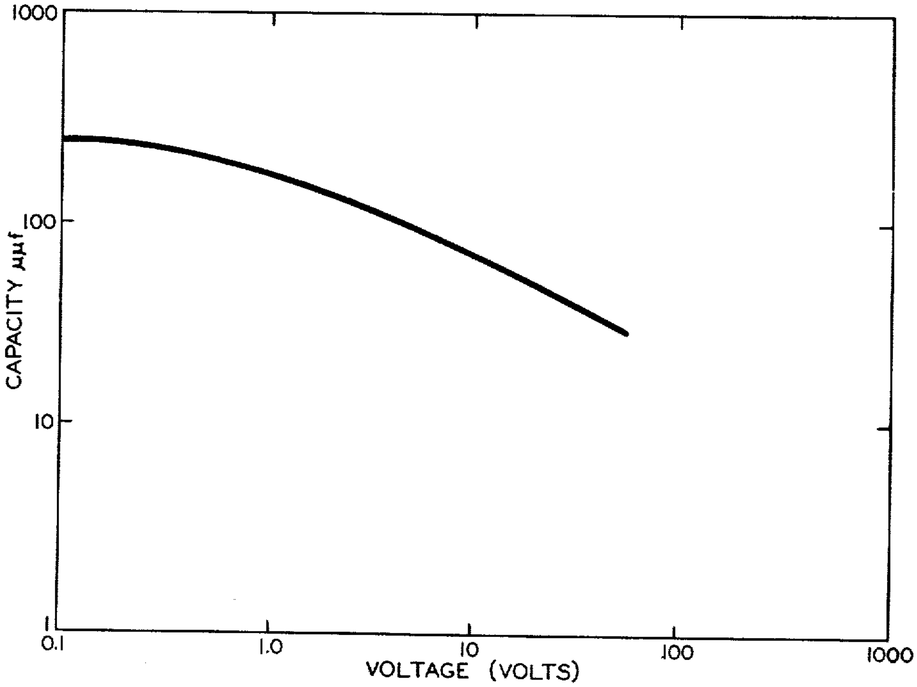

This invention relates to a low level voltage to frequency converter. In one aspect the invention relates to a novel voltage to frequency converter for data collection systems. In another aspect the invention relates to method and apparatus for measuring temperature. In yet another aspect the invention relates to temperature regulating systems. In a still further aspect the invention relates to method and apparatus for converting a low level transducer signal, such as from thermocouples, to digital form. In another aspect the invention relates to a novel analog signal to digital signal converter. In a still further aspect the invention relates to the utilization of voltage-sensitive capacitors in a low level analog voltage to frequency converter.

Heretofore, when it was desired to convert a low level voltage, such as the output from a thermocouple or strain gauge bridge, to a signal for use in digital computers, it was necessary to utilize a high gain amplifier to amplify the transducer signal. It was then necessary to employ an analog to digital converter to change the analog signal into a form acceptable by digital computers. The required equipment was both complicated and expensive.

It has now been found that the necessity of high gain amplification can be substantially reduced or eliminated through the utilization of a reference oscillator circuit and an oscillator circuit containing voltage-sensitive capacitors, such as silicon or germanium capacitors. The variations in the capacity of the voltage-sensitive capacitors are dependent on the variations in the input voltage signal applied to the voltage-sensitive capacitors. The frequency of the oscillator circuit containing the voltage-sensitive capacitors varies in correlation with the variations in capacity of the voltage-sensitive capacitors, and is compared with the frequency of the reference oscillator circuit. The output of the comparator can then be fed through a gating circuit to a binary counter which counts the number of cycles for a preset time interval. At the end of the gate interval the count as held in the binary counter register is proportional to the analog input voltage. The output of the comparator can be fed to a recorder and/or to control circuits for the regulation or control of the variable being measured and/or the regulation or control of a second variable responsive to variations in the variable being measured. The reference oscillator circuit can obtain voltage-sensitive capacitors whose capacity is varied responsive to a reference voltage or to the output of a zero suppression voltage programmer.

Accordingly, it is an object of the invention to provide a simple and relatively inexpensive means for converting a low level voltage to a digital signal. Another object of the invention is to eliminate or substantially reduce the necessity of high gain amplification in the conversion of a low voltage transducer signal into a digital signal. Yet another object of the invention is to provide a novel means for measuring and/or controlling temperature variations. It is another object of the invention to provide an analog to digital converter wherein the zero suppression voltage can be easily and rapidly changed according to a predetermined program.

Other aspects, objects and advantages of the invention will be apparent from a study of the disclosure, the drawing and the appended claims.

Figure 2:
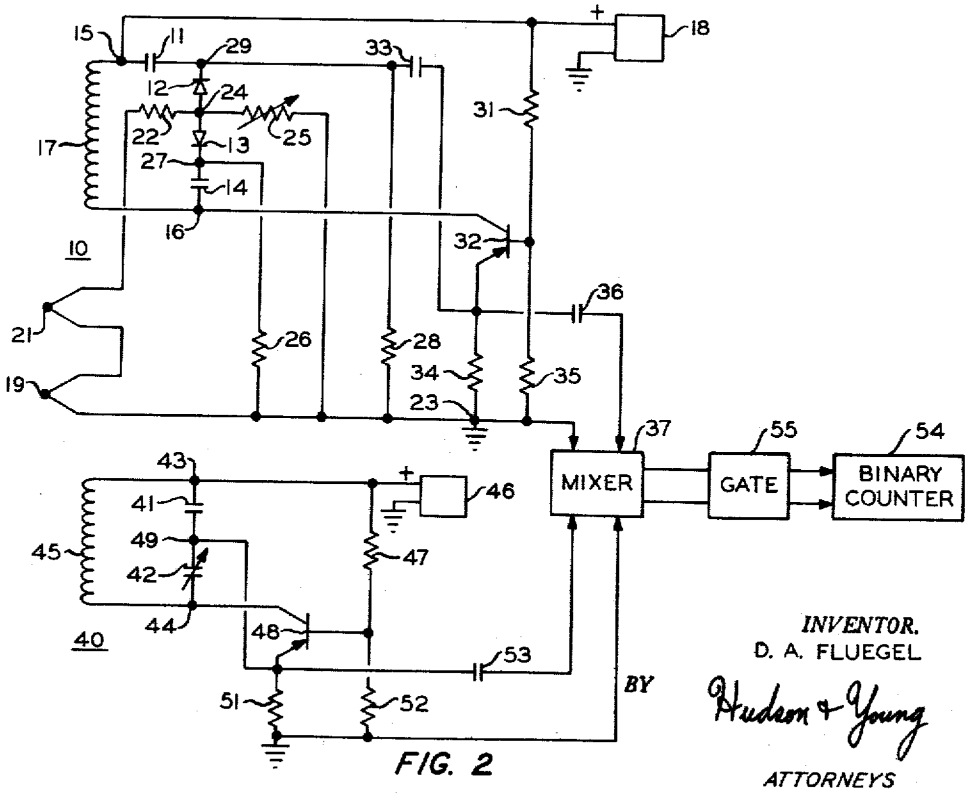
Figure 3:
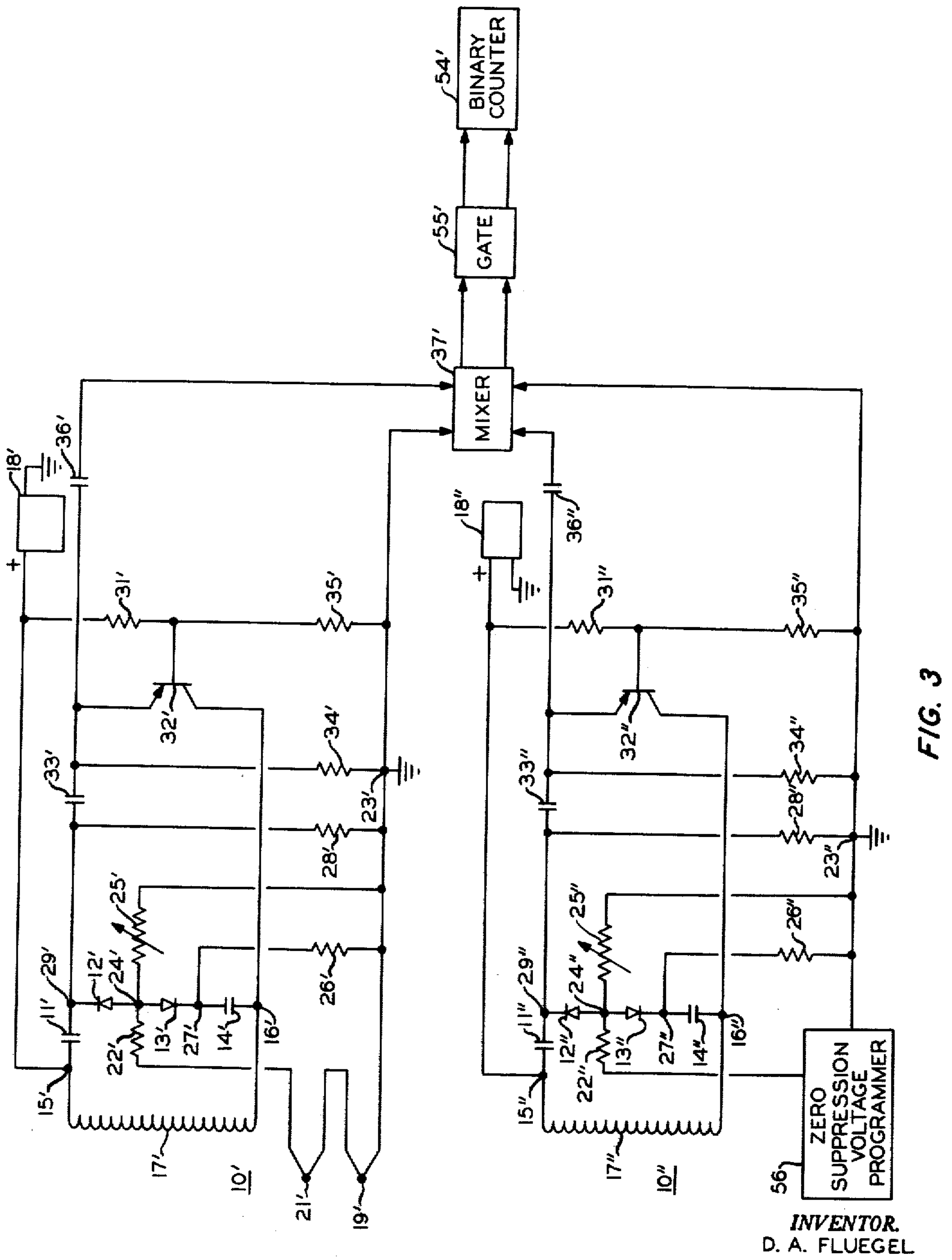

In the drawing FIGURE 1 is a graph showing a typical voltage versus capacity curve for silicon capacitors; FIGURE 2 is a schematic representation of a first embodiment of the invention; and FIGURE 3 is a schematic representation of a second embodiment of the invention.

Silicon capacitors, which are particularly suitable for use in the invention, are p-n junctions formed in single-crystal silicon by techniques used in the manufacture of semiconductor devices. At a p-n junction the density of charge carriers (electrons in the n region and holes in the p region) is reduced virtually to zero when a voltage is applied across the junction in the reverse direction from that causing easy current flow. As the voltage increases, the region of zero carrier density, known as the depletion region, gets wider. In effect this moves apart the two conducting areas and decreases the capacity as if there were two metal plates separated by a dielectric whose thickness was variable. The area of the plates remains the same; the dielectric constant is unchanged; but the thickness of the dielectric varies according to the applied voltage.

The junction can be biased at any desired value as low as zero volts (or even up to 0.4 volt in the opposite direction) regardless of the magnitude of the signal voltage. In the normal bias direction, the capacity will continue to decrease as the voltage is increased. Thus, as shown in FIGURE 1, the capacity of a typical silicon capacity can decrease from a value of approximately 240 mmf. corresponding to an applied voltage 0.1 volt to a value of approximately 30 mmf. corresponding to an applied voltage of 50 volts. As the voltage in the normal bias direction is decreased the capacity will increase.

In FIGURE 2 the measuring oscillator circuit 10 comprises capacitor 11, voltage-sensitive capacitors 12 and 13, and isolating capacitor 14 connected in series between terminals 15 and 16 and in parallel with inductance 17 to form a tank circuit. Voltage-sensitive capacitors 12 and 13 are connected in back-to-back relationship. A power supply 18 is connected between terminal 15 and ground. A reference thermocouple 19, a measuring thermocouple 21, and a resistor 22 are connected in series between ground terminal 23 and junction 24 between voltage-sensitive capacitors 12 and 13. Span adjusting resistor 25 is connected between junction 24 and ground. Resistor 26 is connected between ground and the junction 27 between voltage-sensitive capacitor 13 and capacitor 14. Resistor 28 is connected between ground and the junction 29 between capacitor 11 and voltage-sensitive capacitor 12.

Terminal 15 is connected through resistor 31 to the base of transistor 32. Terminal 16 is connected to the collector of transistor 32, while junction 29 is connected to the emitter of transistor 32 through isolating capacitor 33. The emitter of transistor 32 is connected to ground terminal 23 through resistor 34, while the base of transistor 32 is connected to ground through resistor 35. The emitter of transistor 32 is connected through isolating capacitor 36 to one of a first pair of input terminals of mixer 37, while the other input terminal of said first pair is connected to ground.

The reference oscillator circuit 40 comprises capacitor 41 and variable capacitor 42 connected in series between terminals 43 and 44 and in parallel with inductance 45. A suitable power supply 46 is connected between terminal 43 and ground. Terminal 43 is connected through resistor 47 to the base of transistor 48 while terminal 44 is connected to the collector of transistor 48. The junction 49 between capacitors 41 and 42 is connected to the emitter of transistor 48 which in turn is connected to ground through resistance 51. The base of transistor 48 is connected to ground through resistor 52. The emitter of transistor 48 is connected through isolating capacitor 53 to one of a second pair of input terminals of mixer 37 while the other terminal of said second pair is connected to ground. The output of mixer 37 can be applied to a recorder and/or control circuits. As shown in FIGURE 2 the output of mixer 37 can be connected to a binary counter 54 through a gate circuit 55.

In FIGURE 3 there is shown a modification of the invention wherein measuring oscillator circuit 10' is identical to measuring oscillator circuit 10 of FIGURE 2 and reference oscillator circuit 10'' is identical to measuring oscillator circuit 10' except in the substitution of a zero suppression voltage programmer 56 for the thermocouples 19' and 21'. This provides for balanced oscillator circuits and reduces or eliminates the difficulties encountered in the use of two different oscillator circuits. The utilization of voltage-sensitive capacitors 12'' and 13'' in the reference oscillator permits the reference frequency to be easily and accurately changed manually or according to a predetermined program, such as the output of zero suppression voltage programmer 56.

In the operation of FIGURE 2 reference oscillator circuit 40 generates a constant-frequency reference signal which is fed to mixer 37. The frequency of the reference signal can be adjusted through the adjustment of variable condenser 42. Such adjustment can be done either manually or by suitable automatic means. Measuring oscillator circuit 10 generates a measuring signal, the frequency of which varies responsive to variations in the capacity of voltage-sensitive capacitors 12 and 13, which in turn varies responsive to the voltage across thermocouple 21. This measuring signal is fed to mixer 37 wherein the measuring signal and the reference signal are mixed and the sum or difference frequencies are fed to gate 55. During a gating period gate 55 will permit the output of mixer 37 to pass to binary counter 54 which will count the number of cycles during the preset time interval of the gating period. At the end of the gating period the count as held in the binary counter register will be proportional to the voltage across thermocouple 21.

It is within the scope of the invention to apply the output of mixer 37 to recorders and/or control circuits to regulate the variable being measured or to regulate a second variable responsive to variations in the variable being measured.

The principle of operation of FIGURE 3 is similar to that of FIGURE 2. The balanced oscillator circuits permit greater accuracy, and the utilization of the voltage-sensitive capacitors 12'' and 13'' in the reference oscillator circuit 10'' permits the reference base to be altered rapidly and accurately by the application of the zero suppression voltage across the voltage-sensitive capacitors 12'' and 13''.

While elements 32, 48, 32' and 32'' have been shown as transistors, it is within the scope of the invention to utilize any suitable equivalents such as electron tubes. Thus the term current collecting electrode can be used to include plates of electron tubes and collectors of transistors. Similarly the term current emitter can be used to include cathodes and emitters, while the term control electrode can be used to include grids and bases, and the term amplifying device can be used to include electron tubes and transistors.

In the foregoing description of the invention specific numerical values have not been assigned to the circuit elements since the values of those elements are not critical and the invention does not depend on the use of particular values.

Reasonable variation and modifications are possible within the scope of the disclosure, the drawing, and the appended claims to the invention.

I claim:

1. A low level voltage to frequency converter which comprises, in combination:

(1) a measuring oscillator circuit comprising first and second terminals; a first inductance connected between said first and second terminals; a first capacitor, a first voltage-sensitive capacitor, a second voltage-sensitive capacitor, and a second capacitor connected in series between said first and second terminals and in parallel with said first inductance; a reference thermocouple, a measuring thermocouple, and a first resistor connected in series between ground and a first junction between said first and second voltage-sensitive capacitors; a power supply connected between said first terminal and ground; a span adjusting variable resistor connected between said first junction and ground; a second resistor connected between ground and a second junction between said second voltage-sensitive capacitor and said second capacitor; a third resistor connected between ground and a third junction between said first capacitor and said first voltage-sensitive capacitor; a first transistor; a third capacitor and fourth resistor connected in series between said third junction and ground; means connecting the junction between said third capacitor and said fourth resistor to emitter of said first transistor; means connecting said second terminal to the collector of said first transistor; a fifth resistor connected between said first terminal and the base of said first transistor; and a sixth resistor connected between the base of said first transistor and ground;

(2) a reference oscillator circuit comprising third and fourth terminals; a second inductance connected between said third and fourth terminals; a fourth capacitor and an adjustable capacitor connected in series between said third and fourth terminals and in parallel with said second inductance; a power supply connected betweeen said third terminal and ground; a second transistor; means connecting said fourth terminal to the collector of said second transistor; a seventh resistor connected between said third terminal and the base of said second transistor; means connecting the junction between said fourth capacitor and said adjustable capacitor to the emitter of said second transistor; an eighth resistor connected between the emitter of said second transistor and ground; a ninth resistor connected between the base of said second transistor and ground; and (3) an output circuit comprising a frequency mixer having a first and second pair of input terminals; a fifth capacitor connected between the emitter of said first transistor and one of said first pair of input terminals; a sixth capacitor connected between the emitter of said second transistor and one of said second pair of input terminals; and means connecting the other terminals of said first and second pairs to ground.

2. The apparatus according to claim 1 wherein said adjustable capacitor is a third voltage-sensitive capacitor and said reference oscillator circuit further comprises means for applying a reference voltage across said third voltage-sensitive capacitor.

3. The apparatus according to claim 1 wherein said output circuit further comprises a gating circuit, a binary counter, means connecting the output of said mixer to an input of said gating circuit, and means connecting the output of said gating circuit to said binary counter.

4. A variable frequency oscillator circuit comprising first, second, and third terminals; an inductance connected between said first and second terminals; first, second, and third capacitors connected in series between said first and second terminals and in parallel with said inductance, said second and third capacitors being voltage-sensitive capacitors; a source of variable voltage connected between said third terminal and the junction between said second and third capacitors; means for connecting a source of potential to said first terminal; an amplifying device having a current emitter, a current collector, and a control electrode; means connecting said second terminal to said current collector; means connecting said current emitter to the junction between said first and second capacitors; a first resistor connected between said first terminal and said control electrode; a second resistor connected between said control electrode and said third terminal; and output means connected between said current emitter and said third terminal.

5. An electrical measuring circuit comprising, in combination:

(1) a measuring oscillator circuit comprising first, second, and third terminals; an inductance connected between said first and second terminals; first, second, and third capacitors connected in series between said first and second terminals and in parallel with said inductance, said second and third capacitors being voltage-sensitive capacitors; a transducer adapted to produce a low voltage signal proportional to the variable being measured; means connecting the output of said transducer between said third terminal and the junction between said second and third capacitors; means for connecting a source of potential to said first terminal; an amplifying device having a current emitter, a current collector, and a control electrode; means connecting said second terminal to said current collector; means connecting said current emitter to the junction between said first and second capacitors; a first resistor connected between said control electrode and said third terminal; and output means connected between said current emitter and said third terminal;

(2) a reference oscillator circuit adapted to produce a reference frequency; and, (3) an output circuit comprising a frequency mixer, means connecting said output means of said measuring oscillator circuit to a first input means of said mixer, and means connecting the output of said reference oscillator circuit to a second input means of said mixer.

6. The apparatus according to claim 5 wherein said reference oscillator circuit comprises third and fourth voltage-sensitive capacitors connected in series in the tank circuit of said reference oscillator circuit, and means for applying a reference voltage across said third and fourth voltage-sensitive capacitors to thereby vary the frequency of said reference oscillator circuit.

7. The apparatus according to claim 6 wherein said means for applying a reference voltage comprises a zero suppression voltage programmer.

8. An electrical measuring circuit comprising in combination: a measuring oscillator circuit comprising a tank circuit, first and second voltage sensitive capacitors connected in said tank circuit, and means for applying a variable voltage across said first and second voltage-sensitive capacitors; a reference oscillator circuit; a frequency mixer, means for applying the output of said measuring oscillator circuit to a first input on said mixer, and means for applying the output of said reference oscillator circuit to a second input on said mixer.

9. The apparatus according to claim 8 further comprising a gating circuit, a digital counter, means connecting the output of said mixer to said gating circuit, and means connecting the output of said gating circuit to said digital counter.

10. The apparatus according to claim 8 further comprising a control circuit for regulating a process variable responsive to said variable voltage, and means connecting the output of said mixer to said control circuit.

11. The apparatus according to claim 8 wherein said first and second voltage-sensitive capacitors are silicon capacitors.

12. A low level voltage to frequency converter which comprises, in combination:

(1) a measuring oscillator circuit comprising first and second terminals; a first inductance connected between said first and second terminals; a first capacitor, a first voltage-sensitive capacitor, a second voltage-sensitive capacitor, and a second capacitor connected in series between said first and second terminals and in parallel with said first inductance; a reference thermocouple, a measuring thermocouple, and a first resistor connected in series between ground and a first junction between said first and second voltage-sensitive capacitors; a power supply connected between said first terminal and ground; a span adjusting variable resistor connected between said first junction and ground; a second resistor connected between ground and a second junction between said second voltage-sensitive capacitor and said second capacitor; a third resistor connected between ground and a third junction between said first capacitor and said first voltage-sensitive capacitor; a first transistor; a third capacitor and fourth resistor connected in series between said third junction and ground; means connecting the junction between said third capacitor and said fourth resistor to the emitter of said first transistor; means connecting said second terminal to the collector of said first transistor; a fifth resistor connected between said first terminal and the base of said first transistor; and a sixth resistor connected between the base of said first transistor and ground;

(2) a reference oscillator circuit comprising third and fourth terminals; a second inductance connected between said third and fourth terminals; a fourth capacitor, a third voltage-sensitive capacitor, a fourth voltage-sensitive capacitor, and a fifth capacitor connected in series between said third and fourth terminals and in parallel with said second inductance; bias means connected between ground and the junction between said third and fourth voltage-sensitive capacitors for applying a reference voltage across said third and fourth voltage-sensitive capacitors; a power supply connected between said third terminal and ground; a span adjusting variable resistor connected between ground and said junction between said third and fourth voltage-sensitive capacitors; a seventh resistor connected between ground and the junction between said fourth voltage-sensitive capacitor and said fifth capacitor; an eighth resistor connected between ground and the junction between said fourth capacitor and said third voltage-sensitive capacitor; a second transistor; a sixth capacitor and a ninth resistor connected in series between ground and said junction between said fourth capacitor and said third voltage-sensitive capacitor; means connecting the junction between said sixth capacitor and said ninth resistor to the emitter of said second transistor; means connecting said fourth terminal to the collector of said second transistor; a tenth resistor connected between said third terminal and the base of said second transistor; and an eleventh resistor connected between said base of said second transistor and ground;

(3) an output circuit comprising a frequency mixer having a first and second pair of input terminals; a seventh capacitor connected between the emitter of said first transistor and one of said first pair of input terminals; an eighth capacitor connected between the emitter of said second transistor and one of said second pair of input terminals; and means connecting the other terminals of said first and second pairs to ground.

13. Apparatus according to claim 12 wherein said bias means comprises a zero suppression voltage programmer.

14. Apparatus according to claim 12 wherein said output circuit further comprises a gating circuit, a binary counter, means connecting the output of said mixer to an input of said gating circuit, and means connecting the output of said gating circuit to said binary counter.

15. An analog to digital converter for low voltage analog signals comprising first, second, and third terminals; an inductance connected between said first and second terminals; first and second voltage-sensitive capacitors connected in series between said first and second terminals and in parallel with said inductance; means for applying an analog voltage signal between said third terminal and the junction between said first and second voltage sensitive capacitors; an amplifier; means for connecting said first and second terminals to said amplifier to form an oscillator circuit; a gating circuit; means for connecting the output of said oscillator circuit to the input of said gating circuit; a binary counter; and means for connecting the output of said gating circuit to the input of said binary counter.

16. An analog to digital converter for low voltage analog signals comprising first, second, and third terminals; an inductance connected between said first and second terminals; first and second voltage-sensitive capacitors connected in series between said first and second terminals and in parallel with said inductance; means for applying an analog voltage signal between said third terminal and the junction between said first and second voltage sensitive capacitors; an amplifier; means for connecting said first and second terminals to said amplifier to form a first oscillator circuit; a reference oscillator circuit; a frequency mixer; means for connecting the output of said first oscillator circuit to a first input of said mixer; means for connecting the output of said second oscillator circuit to a second input of said mixer; a gating circuit; means for connecting the output of said mixer to an input of said gating circuit; a binary counter; and means for connecting the output of said gating circuit to an input of said binary counter.

17. Apparatus in accordance with claim 16 wherein said reference oscillator circuit comprises third and fourth voltage-sensitive capacitors connected in series in the tank circuit of said reference oscillator circuit, and means for applying a reference voltage across said third and fourth voltage-sensitive capacitors to thereby vary the frequency of said reference oscillator circuit.

18. Apparatus in accordance with claim 16 wherein said means for applying a reference voltage comprises a zero suppression voltage programmer.

References Cited in the file of this patent

UNITED STATES PATENTS 2,721,267 Collins ---------------- Oct. 18, 1955

OTHER REFERENCES

"Circuit Applications of Voltage-Sensitive Capacitors" (Jenkins), published by Electrical Manufacturing, December 1954. Copy in Scientific Library, Div. 72. Page 88, FIG. 17 relied on.

UNITED STATES PATENT OFFICE

CERTIFICATE OF CORRECTION

Patent No. 3,094,875 June 25, 1963

Dale A. Fluegel

It is hereby certified that error appears in the above numbered patent requiring correction and that the said Letters Patent should read as corrected below.

Column 8, line 15, for the claim reference numeral "16" read -- 17 --.

Signed and sealed this 14th day of January 1964.

SEAL)
ttest:

RNEST W. SWIDER ttesting Officer

EDWIN L. REYNOLDS

Acting Commissioner of Patents